United States Patent [19]

Cook et al.

[11] Patent Number: 5,392,514

[45] Date of Patent: Feb. 28, 1995

[54] METHOD OF MANUFACTURING A COMPOSITE BLADE WITH A REINFORCED LEADING EDGE

[75] Inventors: James A. Cook, Agawam; David P. Nagle, Westfield, both of Mass.

[73] Assignee: United Technologies Corporation, Hartford, Conn.

[21] Appl. No.: 123,769

[22] Filed: Sep. 20, 1993

Related U.S. Application Data

[63] Continuation of Ser. No. 832,119, Feb. 6, 1992, abandoned.

[51] Int. Cl.6 ............................................. B23P 15/00
[52] U.S. Cl. .................................. 29/889.71; 29/889.7
[58] Field of Search ............... 29/889.6, 889.61, 889.7, 29/889.71; 264/103, 46.4, 46.7, 45.1, 279.1; 416/224, 230, 241 A, 241 R, 226

[56] References Cited

U.S. PATENT DOCUMENTS

| | | | |
|---|---|---|---|
| 4,268,571 | 4/1981 | McCarthy | 428/236 |
| 4,298,417 | 11/1981 | Euler et al. | 29/889.71 |
| 4,470,862 | 9/1984 | More et al. | 156/245 |
| 4,471,020 | 9/1984 | McCarthy | 428/309 |
| 4,524,499 | 6/1985 | Grimes et al. | 29/156.8 |
| 4,648,921 | 3/1987 | Nutter, Jr. | 156/77 |
| 4,990,205 | 2/1991 | Barbier et al. | 29/889.6 |
| 5,041,182 | 8/1991 | Sekiguchi et al. | 156/245 |
| 5,042,968 | 8/1991 | Fecto | 416/226 |
| 5,123,814 | 6/1992 | Burdick et al. | 29/889.71 |
| 5,127,802 | 7/1992 | Carlson et al. | 29/889.71 |

Primary Examiner—Irene Cuda

[57] ABSTRACT

A method of making a shell (30) of a lightweight composite propulsor blade (10) of spar and shell construction having a leading edge portion (39) having twice the thickness as the remainder (33, 35, 37) of the shell thereby enhancing resistance to foreign object damage and improving erosion resistance.

5 Claims, 2 Drawing Sheets

METHOD OF MANUFACTURING A COMPOSITE BLADE WITH A REINFORCED LEADING EDGE

This is a continuation of U.S. patent application Ser. No. 07/832,119, filed Feb. 6, 1992, now abandoned.

TECHNICAL FIELD

The present invention relates to propulsor blades of a spar and shell construction and, more specifically, to lightweight propulsor blades, such as propeller blades, prop-fan blades, turbo-fan blades and the like having a load bearing spar, composite or metallic, and a surrounding fiber reinforced shell.

BACKGROUND ART

In aircraft applications it is highly desirable to minimize the weight of aircraft components as every pound saved in aircraft weight translates to fuel savings and/or greater payload capacity. With respect to propeller, turboprop or turbofan aircraft engine components, it is well appreciated that the propulsor blades are the most likely candidate for weight reduction since the weights of other related components, e.g. blade retention means, pitch change mechanisms, hub disks, shafts and bearings, are typically directly dependent upon the magnitude of the blade centrifugal loading borne by these components. The propulsor blades per se, however, can be made lighter in weight by manufacturing the blades in a spar and shell construction wherein the blade is formed of outer shell made of lightweight composite material, such as fiber reinforced resin, and an internal load bearing spar which is typically a metallic or composite member bonded to the interior surface of the shell and extends from within the shell cavity to terminate beyond the shell in a root end which is adapted to be mounted to a suitable blade retention means. Examples of such spar and shell construction blades are presented in commonly assigned U.S. Pat. Nos. 4,470,862; 4,648,921; and 5,042,968.

It has become conventional practice in the aircraft industry to manufacture such spar and shell blades with the shell formed about the load bearing spar as a molded fiber reinforced resin body formed by layers of fabric impregnated with resin, commonly via resin transfer molding methods, and cured in a mold contoured to the airfoil shape desired for the blade. Such fiber reinforced resin shells exhibit high strength and low weight characteristics and in aircraft applications typically offer at least as high strength as corresponding articles made of metal at a substantially lower weight.

For example, commonly assigned U.S. Pat. No. 4,648,921 discloses a method of making a fiber reinforced airfoil shaped propeller blade assembly wherein 4 to 7 layers of woven fiberglass cloth are layed up over a spar/foam underbody comprising a full length metallic spar having foam leading and trailing edges. The spar/foam underbody is formed by injecting a lightweight foam material into a mold disposed about an adhesive coated full length metallic spar and suitably curing the foam. A particular method of making such a spar/foam underbody for a propulsor blade is disclosed in commonly assigned U.S. Pat. No. 5,042,968. After curing, the spar/foam underbody is wrapped in multiple layers of fibrous cloth, such as fiberglass cloth, each of the fiberglass layers being trimmed to its desired contour and then hand stitched in place over the underbody. Alternately, as disclosed in commonly assigned U.S. Pat. No. 4,470,862, the hand stitching may be eliminated by adhesively bonding each fiberglass layer to the layer therebeneath. To do so, the fiberglass material is provided on its underside with a minute, but effective, amount of thermoplastic adhesive. The material is then trimmed to shape and placed in position over the subassembly. Thereafter the adhesive is activated by heat and pressure by means of an electric resistance heated hand iron applied to the surface of the fiberglass material. In either case, this cloth wrapped assembly is then placed in a second mold and a synthetic polymeric material, such as epoxy resin, is injected into the fiber matrix and then cured. Alternatively, the resin may be applied to the fibrous cloth of the wrapped subassembly to preimpregnate the fibrous cloth before it is placed into the curing mold.

A light-weight rotary machine blade comprising a composite spar, formed of a partial length metal root and a spanwisely extending foam body wrapped in an aramid fiber wrap reinforced with high strength graphite plies, and a surrounding fiber-reinforced composite shell is disclosed in commonly assigned, U.S. Pat. No. 5,269,658, of John A. Violette and Charles E. K. Carlson. Also disclosed therein is a method for manufacturing such a composite blade comprising the steps of: installing an elongated core of lightweight cellular foam material into a receiving cavity defined by the flared distal end of a foreshortened metal spar so as to extend axially outwardly therefrom, thence laying up a laminate fiber wrap of alternating plies of spanwisely oriented graphite fibers and angularly woven plies of high strength aramid fibers thereabout to form a spar subassembly, thence attaching leading and trailing edge fillers of lightweight foam material to the composite spar subassembly to form the desired contoured shape of the blade, thereafter laying up a laminate wrap of layered plies of high strength aramid fibers about the shaped spar/foam subassembly except for the root end of the spar, and thence placing the wrapped spar/foam subassembly into a conforming mold and impregnating the wrapped spar/foam subassembly with an epoxy resin via resin transfer molding techniques to yield a resin reinforced assembly which upon curing constitutes the lightweight composite blade.

In such lightweight propulsor blades of spar and shell construction, the spar comprises the primary loading bearing member for effectively transmitting the centrifugal pull, bending moments, torsion loads and vibratory loads imposed upon the blades during operation to the blade retention means for distribution to the load carrying blade retention structure and the hub into which the blades are mounted. However, the shell of the blade, in addition to forming the desired airfoil shape of the propulsor blade, also participates in transmitting a portion of these loads imposed upon the propulsor blade to the load carrying blade retention structure. Unlike the spar, the shell is exposed to the environment and therefore susceptible to damage in the event that the propulsor blade is struck by a foreign object, for example a bird, a rock or the like. Accordingly, it is customary to protect the leading edge of such a fiber reinforced resin shell with a protective metallic sheath, typically made of nickel or titanium or alloys thereof, to absorb the impact energy imparted to the blade by a foreign object strike and prevent, or least lessen, damage to the foam leading edge filler disposed beneath the shell and about the leading edge of the spar.

DISCLOSURE OF INVENTION

It is an object of the present to provide a lightweight propulsor blade of spar and shell construction wherein the leading edge portion of the airfoil shaped shell has a double thickness to provide improved protection against foreign object damage.

It is also an object of a further aspect of the present invention to provide a method of manufacturing a propulsor blade of lightweight composite spar and shell construction having a leading edge shell portion of double thickness to provide improved protection against foreign object damage.

In accordance with the present invention, a propulsor blade is provided comprising an inner loading bearing spar assembly and an outer airfoil shaped fiber reinforced resin shell having a double thick leading edge portion. The shell is formed of a plurality of layers of fabric laid up layer over layer with each fabric layer overlapping the leading edge portion of the spar assembly twice as many times as it overlaps the remainder of the spar assembly, thereby providing a shell wrap having a leading edge portion which is twice as thick as the remainder of the shell wrap.

In accordance with another aspect of the present invention, there is provided a method of manufacturing a lightweight composite propulsor blade of spar and shell construction comprising the steps of: forming a load bearing spar assembly; wrapping at least one fabric sheet, most advantageously a fabric blanket formed of a plurality of fabric layers, over the spar assembly such that the fabric sheet overlaps the leading edge portion of the spar assembly twice; impregnating the fabric wrap with a curable resin material; and curing the impregnated blade subassembly. The spar assembly may be made of a metallic or composite load bearing spar member having a leading edge filler body of lightweight cellular foam material mounted to its leading edge and a trailing edge filler body of lightweight cellular foam material mounted to its trailing edge.

BRIEF DESCRIPTION OF DRAWING

These and other objects, features and advantages of the present invention will become more apparent in light of the detailed description of the embodiment thereof illustrated in the accompanying drawing wherein.

BEST MODE FOR CARRYING OUT THE INVENTION

The present invention will be described hereinafter in greater detail with reference to a composite lightweight blade 10 for use on an aircraft propulsor, such as a propeller driven by a turbine engine. However, it is to be understood that the present invention relates to any type of composite, lightweight propulsor blade, whether it is termed a propeller, a turboprop, or a fan blade and irrespective of whether the propulsor on which the blade is to be used comprises a propeller engine, a turboprop engine, a ducted or unducted turbofan engine, or other type of bladed propulsor.

Figure 1:
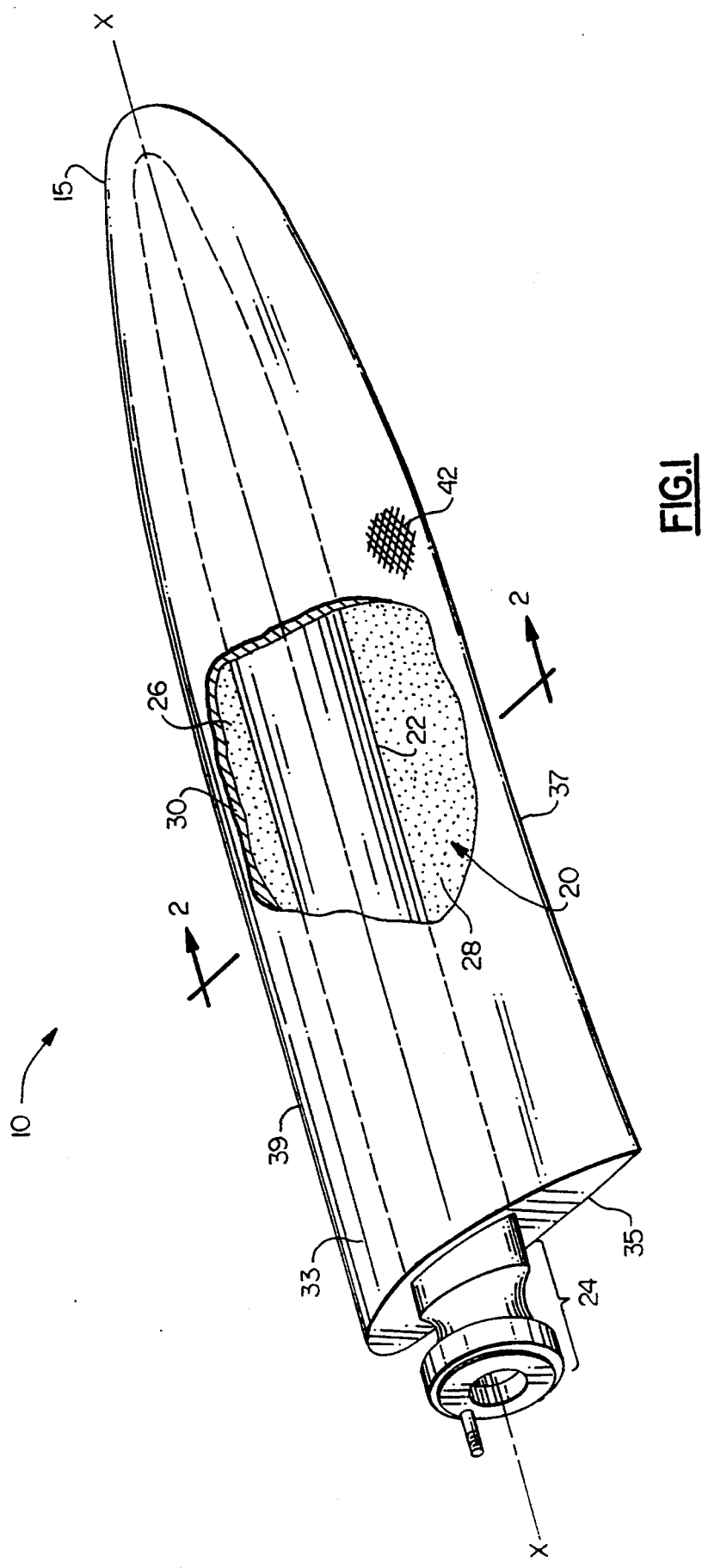
FIG. 1 is a partially sectioned, perspective view illustrating a propeller blade of spar and shell construction having a shell with a double thickness leading edge portion.
Figure 2:
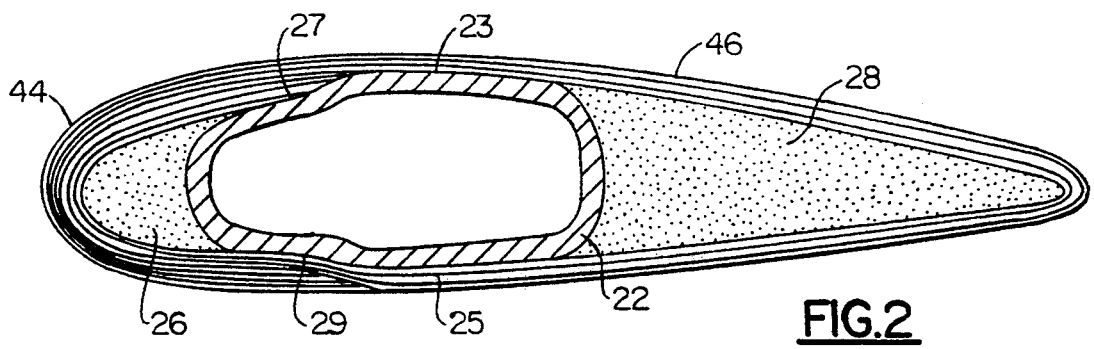
FIG. 2 is a cross-sectional view along line 2—2 of FIG. 1.

Referring now in FIGS. 1 and 2, the blade 10 of the present invention comprises a spar/foam assembly 20 which extends spanwisely along the length of the blade 10 and a shell 30 which encompasses the spar assembly 20 to define the desired airfoil contour of the blade. The airfoil shell 30 of the blade 10 is formed of a fiber reinforced resin material and has a pressure side 35, a suction side 33, a trailing edge portion 37 and a leading edge portion 39, which in accordance with the present invention has double the thickness of the remainder of the shell 30, thereby providing improved resistance to foreign object damage. For example, in the embodiment of the blade 10 of the present invention as illustrated in FIG. 2, the leading edge portion 39 of the shell 30 is formed of six laminates of fabric wrap while the remainder of the shell 30 is formed of only three laminates of fabric wrap. Thus, rather than being of uniform thickness as in prior art blades, the shell 30 of the blade 10 of the present invention has a leading edge portion 39 which has a thickness double the uniform thickness of the remainder of the shell 30.

The spar assembly 20 of the blade 10 provides the primary structure for transmitting blade loads to the propeller hub and serves as an underbody about which the fibrous reinforcing material is wrapped to form the blade shell 30. Advantageously, the spar assembly comprises a load bearing spar member 22 having a proximal root end 24 which serves as a retention member for mounting the blade 10 to the propeller hub (not shown), a leading edge filler body 26 of lightweight material, such as cellular foam, bonded to the leading edge of the spar member 22, and a trailing edge filler body 28 of lightweight material, such as cellular foam, bonded to the trailing edge of the spar member 22. The load bearing spar member 22 may comprise a full spanlength metallic member, for example a steel, aluminum or titanium member, extending from its proximal root end 24 spanwisely along the blade axis x—x to terminate near the blade tip 15, such as for example a solid or hollow tubular member or a foam filled tubular member of a suitably strong metal, such as steel, aluminum or titanium, or a high strength composite material. Alternatively, the load bearing spar member 22 may comprise a composite spar formed of a partial length tulip shaped member of suitably strong metal, such as steel, aluminum or titanium, or a high strength composite material, which extends from a retention root at its proximal end a foreshortened distance along the spanwise axis of the blade to terminate in an open ended distal flared flange adapted to receive a preformed core lightweight cellular material, such as polyurethane foam, which extends spanwisely outwardly therefrom to the blade tip, the preformed foam core and the distal flange of the metal tulip being wrapped in multiple layers of braided structural fiber, such as graphite, aramid or fiberglass, with a ply of unidirectional spanwisely aligned structural fibers disposed between successive braided layers. A load bearing spar assembly of such construction and a method of manufacturing same is disclosed in commonly assigned, U.S. Pat. No. 5,222,297.

Figure 3:
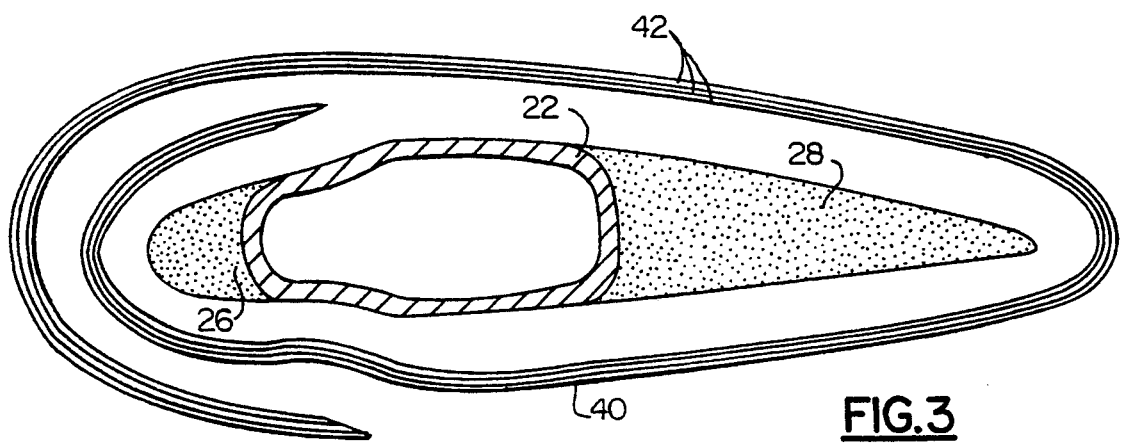
FIG. 3 a cross-sectional view illustrating the manufacture of a propeller blade in accordance with one aspect of the method of the present invention.
Figure 4:
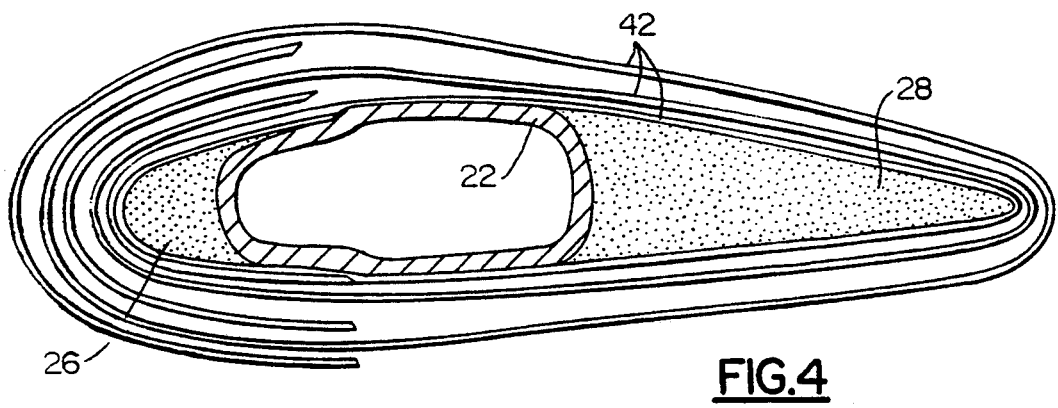
FIG. 4 is a cross-sectional view illustrating the manufacture of a propeller blade in accordance with another aspect of the method of the present invention.

In accordance with the present invention, the shell fabric is layed up over the spar/foam assembly 20 so as to provide the blade 10 with a leading edge 39 having a shell thickness which is about twice the thickness of the remainder of the shell 30. The fabric shell wrap may be layed up about the spar/foam assembly 20 as a single blanket of multiple plies 42, such as illustrated in FIG. 3, or as a series of individual fabric plies 42 layered one upon the other, such as illustrated in FIG. 4. In either case, the shell fabric is most advantageously layed up over the spar/foam assembly 20 by wrapping the shell fabric around the spar/foam assembly 20 as a single continuous multi-ply blanket or successive continuous sheets so as to overlap the leading edge portion of the spar assembly 20 twice, while lapping the remainder of the spar assembly 20 only once. For example, beginning at the suction side 23 of the spar member 22 as illustrated in FIGS. 2, 3 and 4, the shell fabric may be lapped over the leading edge filler body 26 of the spar/foam assembly 20, thence along the pressure side 25 of the spar member 22 thereof and around the trailing edge filler body 28 thereof, thence along the suction side 23 of the spar member 22, and again around the leading edge filler body 26 of the spar/foam assembly 20 to terminate at the pressure side 25 of the spar member 22. Of course, the shell fabric may alternatively be wrapped in the opposite direction around the spar assembly. That is, beginning at the pressure side 25 of the spar member 22, the shell fabric may be lapped over the leading edge filler body 26 of the spar/foam assembly 20, thence along the suction side 23 of the spar member 22 thereof and around the trailing edge filler body 28 thereof, thence along the pressure side 25 of the spar member 22, and again around the leading edge filler body 26 of the spar/foam assembly 20 to terminate at the suction side 23 of the spar member 22. In either case, the overlapping of the multi-ply fabric blanket or the successive individual fabric plies of the shell fabric wrap 40 about the leading edge filler body 26 provides a double thickness leading edge wrap 44 which imparts a double thickness to the leading edge portion 39 of the resultant shell 30, thus providing enhanced resistance to foreign object damage and increased erosion resistance to the blade 10.

The fabric making up the shell wrap 40, whether it is a multi-ply blanket or a plurality of individual plies, typically comprises a cloth of woven fiberglass fibers. It is to be understood, however, that the shell wrap fabric 40 may also comprise a cloth of woven graphite or aramid fibers or other structural fibers, or it may comprise a blend of two or more fibers selected from the group consisting of fiberglass fibers, graphite fibers, aramid fibers or like structural fibers. The shell wrap may advantageously comprise a blanket having two or more individual plies of the cloth material adhesively bonded or stitched together one upon another. If the shell wrap is formed of individual plies 42 of cloth material separately wrapped about the spar assembly 20, each ply may be stitched or adhesively bonded to the ply beneath it. The outer surface of the spar assembly 20 may also be coated with an adhesive to bond the inner surface of the shell wrap 40 to the spar assembly, whether that surface be the inner surface of the multi-ply blanket or the inner surface of the inner ply of a plurality of layered plies 42.

Advantageously, the spar member 22 comprises a spanwisely extending tubular member having an oblate substantially oval-shaped rectangular cross-section with the leading end portion thereof being the narrower end of the oval-shaped spar member 22 and the trailing end portion thereof being the wider end of the oval-shaped spar member 22. The oval-shaped cross section of the spar member 22 facilitates the laying up of a double thickness leading edge shell wrap 44 over the spar assembly 22 by accommodating the transition from the single thickness wrap 46 over the pressure side, trailing edge and suction side of the spar/foam assembly 20 to the double thickness leading edge wrap 44 whereby a smooth contour is maintained on the external surface the finished shell 30. The spar member 22 may also be provided with a spanwisely extending recess 27 in its suction side 23 and a similar spanwisely extending recess 29 in its pressure side 25 to further accommodate the transition from the single thickness wrap 46 to the double thickness leading edge wrap 44.

The fabric shell wrap may be layed up over the spar/foam assembly 20 using dry fabric or using fabric preimpregnated with a curable synthetic polymeric material, such as epoxy resin. If a dry fabric wrap is layed up over the spar/foam assembly 20, the formation of the blade shell 30 is completed by placing the dry fabric wrap covered assembly into an impregnation die (not shown) and injecting the epoxy resin therein so as to impregnate via resin transfer molding the fabric shell wrap covering the spar assembly covering. The particular resin utilized is not germane to the present invention and may be selected as in conventional practice. After curing of the epoxy resin by applying heat and pressure as in conventional practice, a fiber reinforced shell 30 is provided which has a double thickness leading edge portion 39 having enhanced foreign object damage resistance and improved erosion resistance.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A method of manufacturing a composite propulsor blade having an axially extending load bearing spar disposed within a fiber reinforced shell defining an airfoil comprising the steps of:

forming a spar assembly that carries the load absorbed by the propulsive blade having a leading edge, a trailing edge, and a pressure side and a suction side extending therebetween;

wrapping one sheet of fabric material of substantially uniform thickness that is precut to a length exceeding the full extent of the airfoil including the pressure side and suction side defining a blanket about said spar assembly whereby said spar assembly is covered by a fabric wrap by wrapping said one sheet about said spar assembly such that said one sheet overlaps itself at the leading edge so that said fabric wrap has a first relatively uniform thickness overlapping the leading edge of said spar assembly and a second uniform thickness overlapping the remainder of said spar assembly, said first thickness being about twice the thickness as said second thickness; and impregnating said one sheet of fabric material with a curable resin material whereby upon subsequent curing of the resin material a fiber reinforced shell having an approximately double thick leading edge portion is formed about the spar assembly.

2. A method of manufacturing a composite blade as recited in claim 1 including the step of forming the blanket from a plurality of fabric plies about said spar assembly such that the fabric blanket wraps twice about the leading edge portion of said spar assembly and wraps only once about the remainder of said spar assembly.

3. A method of manufacturing a composite propulsor blade as recited in claim 1 wherein the step of forming said spar assembly comprises:
provinding a spanwisely extending load bearing spar member having a leading edge and a trailing edge;
mounting a first filler body of lightweight cellular material on the leading edge of the spar member thereby defining the leading edge of said spar assembly; and
mounting a second filler body of lightweight cellular material on the trailing edge of the spar member thereby defining the trailing edge of said spar assembly.

4. A method of manufacturing a composite propeller blade as recited in claim 3 wherein the step of wrapping one sheet of fabric material about said spar assembly comprises wrapping the at least one sheet of fabric material about said spar assembly such that the fabric blanket wraps twice about the leading edge filler body of said spar assembly and wraps only once about the trailing edge filler body of said spar assembly.

5. A method of manufacturing a composite propeller blade as recited in claim 4 wherein the step of wrapping one sheet of fabric material about said spar assembly comprises wrapping a single blanket of fabric material made up of a plurality of fabric plies about said spar assembly such that the fabric blanket wraps twice about the leading edge filler body of said spar assembly and wraps only once about the trailing edge filler body of said spar assembly.

* * * * *